(12) United States Patent
Bader et al.

(10) Patent No.: US 6,353,857 B2
(45) Date of Patent: Mar. 5, 2002

(54) CONTROLLERLESS MODEM

(75) Inventors: James E. Bader, Raleigh, NC (US); Scott Deans, Redmond, WA (US); Rob Miller, Raleigh, NC (US); Richard P. Tarquini, Apex, NC (US); Bankim Wani; Jack Waters, II, both of Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/832,622

(22) Filed: Mar. 31, 1997

(51) Int. Cl.[7] ............................. G06F 15/16; G06F 9/00; G06F 9/46

(52) U.S. Cl. ..................... 709/246; 709/321; 709/324

(58) Field of Search ................... 395/200.76, 200.34, 395/200.8, 882, 500, 682; 709/246, 204, 250, 232; 710/8, 100, 64, 48; 707/540; 375/220

(56) References Cited

U.S. PATENT DOCUMENTS

| | | | | |
|---|---|---|---|---|
| 4,549,302 A | * | 10/1985 | Heatherington | |
| 5,014,269 A | * | 5/1991 | Picandet | |
| 5,170,470 A | * | 12/1992 | Pindar et al. | 710/8 |
| 5,189,663 A | * | 2/1993 | Williams | |
| 5,450,530 A | * | 9/1995 | Snyder et al. | 375/220 |
| 5,572,675 A | * | 11/1996 | Bergler | 395/682 |
| 5,604,870 A | * | 2/1997 | Moss et al. | 710/100 |
| 5,625,678 A | * | 4/1997 | Blomfield-Brown | |
| 5,659,800 A | * | 8/1997 | Zhang et al. | 395/882 |
| 5,787,305 A | * | 7/1998 | Chen | 707/540 |
| 5,790,895 A | * | 8/1998 | Krontz et al. | 710/64 |
| 5,796,958 A | * | 8/1998 | Koenzen | 395/200.8 |
| 5,802,307 A | * | 9/1998 | Melo | 709/232 |
| 5,812,820 A | * | 9/1998 | Loram | 395/500 |
| 5,864,710 A | * | 1/1999 | Sands et al. | |
| 5,925,114 A | * | 7/1999 | Hoang | 710/48 |

FOREIGN PATENT DOCUMENTS

| | | | | |
|---|---|---|---|---|
| EP | 0 740 253 A2 | 10/1996 | ......... | G06F/13/10 |
| EP | 0 788 057 A1 | 8/1997 | ......... | G06F/13/38 |
| WO | WO 96/35286 | 11/1996 | ......... | H04L/29/10 |

* cited by examiner

Primary Examiner—Robert B. Harrell
Assistant Examiner—Almari Romero
(74) Attorney, Agent, or Firm—Blakely, Sokoloff, Taylor & Zafman LLP

(57) ABSTRACT

A modem is implemented as a virtual device driver with all processing handled by the host computer thus obviating the need for a stand alone processor for the modem. The modem virtual device driver ensures that the modem obtains adequate processing time regardless of other processes running on the host. By combining a port driver directly into the modem contact code, the need for a hardware UART with its attendant limitations is eliminated.

23 Claims, 11 Drawing Sheets

CONTROLLERLESS MODEM

CROSS REFERENCE TO RELATED APPLICATIONS

This application is related to application Ser. No. 08/774,648, filed Dec. 30, 1996, in the name of Richard P. Tarquini and entitled REAL TIME SERVICES IN BACKWARDLY COMPATIBLE OPERATING SYSTEMS, which is hereby incorporated by reference in its entirety.

TECHNICAL FIELD OF THE INVENTION

The invention relates to communication systems, and, more particularly, to a modem which operates without a separate controller.

BACKGROUND OF THE INVENTION

Computers which use a modem for communications are well-known in the art. As discussed more hereinafter, an exemplary computer of this type is shown in FIGS. 1A–1C and its use with a modem for communications is shown in FIG. 1D.

Communications between a computer and a modem typically occurs over a universal asynchronous receiver transmitter (UART) link. Modems can be connected to computers either by inserting a modem card into a bus connector for connecting to the computer bus directly (an internal modem) or modems can be connected to the computer over a communications port, when the modem is external. Internal and external modems of the prior art typically have an onboard processor or controller for managing the data protocols and transfers. The existence of an onboard processor is necessary, in the prior art, in order to ensure that the modem functions get adequate processing time. The need for a dedicated processor is particularly acute in a multi-tasking computer system in which a plurality of simultaneous tasks may be running. If those tasks fail to relinquish the processor to a modem application in a timely fashion, data characters will be lost and a data transfer can be aborted.

THE PROBLEMS

The provision of a separate processor or controller to run a modem, merely to ensure adequate processing power for modem tasks, is expensive and provides redundant capabilities to that which already exist on a computer hosting the modem. The host has its own processor, bus and system clock. Providing these redundantly in a modem provides additional costs which would be obviated if a modem could utilize the host processor capabilities.

Nevertheless, in the past, it has not been feasible to utilize the host processor and bus to do modem processing given the stringent timing requirements needed to ensure reliable data communications over the modem and given the presence of other processes which compete for processor time.

SUMMARY OF THE INVENTION

The invention provides a controllerless modem which utilizes the services of the host processor and ensures reliable data communications even in the presence of competing processes. A controllerless modem in accordance with the invention is guaranteed adequate processing time from the host processor to service communications needs. Further, the controllerless modem of the invention eliminates certain hardware which was necessary to coordinate between the host and the modem in the prior art.

The invention relates to apparatus, methods, systems and computer program products for providing modem functionality as a virtual device driver running on a host processor rather than as a standalone modem having its own processor.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1A:
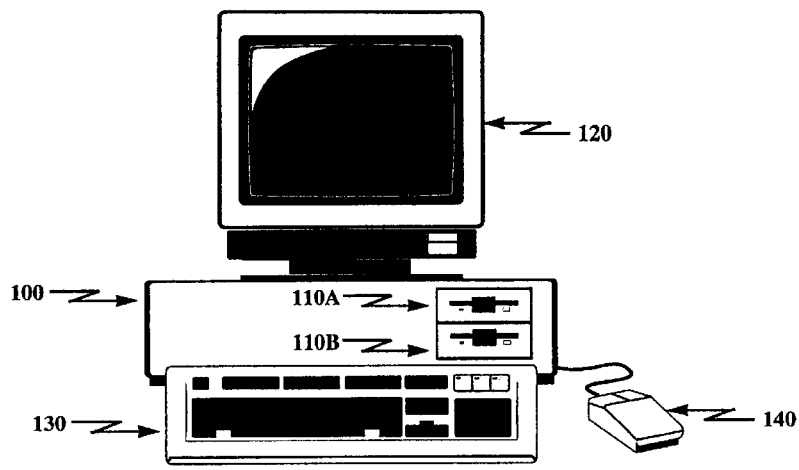
FIG. 1A is an illustration of a computer suitable for use in carrying out the invention.

FIG. 1A is an illustration of an exemplary computer of a type suitable for use in carrying out the invention. FIG. 1A illustrates a computer system having a processor unit 100, a display unit 120, a keyboard 130, and an input/output device, such as a mouse 140. One or more disk drives 110A and 110B may be provided in the processor unit 100 to facilitate the storage and retrieval of information. One of these may be a hard drive (not shown) or drives utilizing removable media such as floppy drives or CD ROM drives.

Figure 1B:
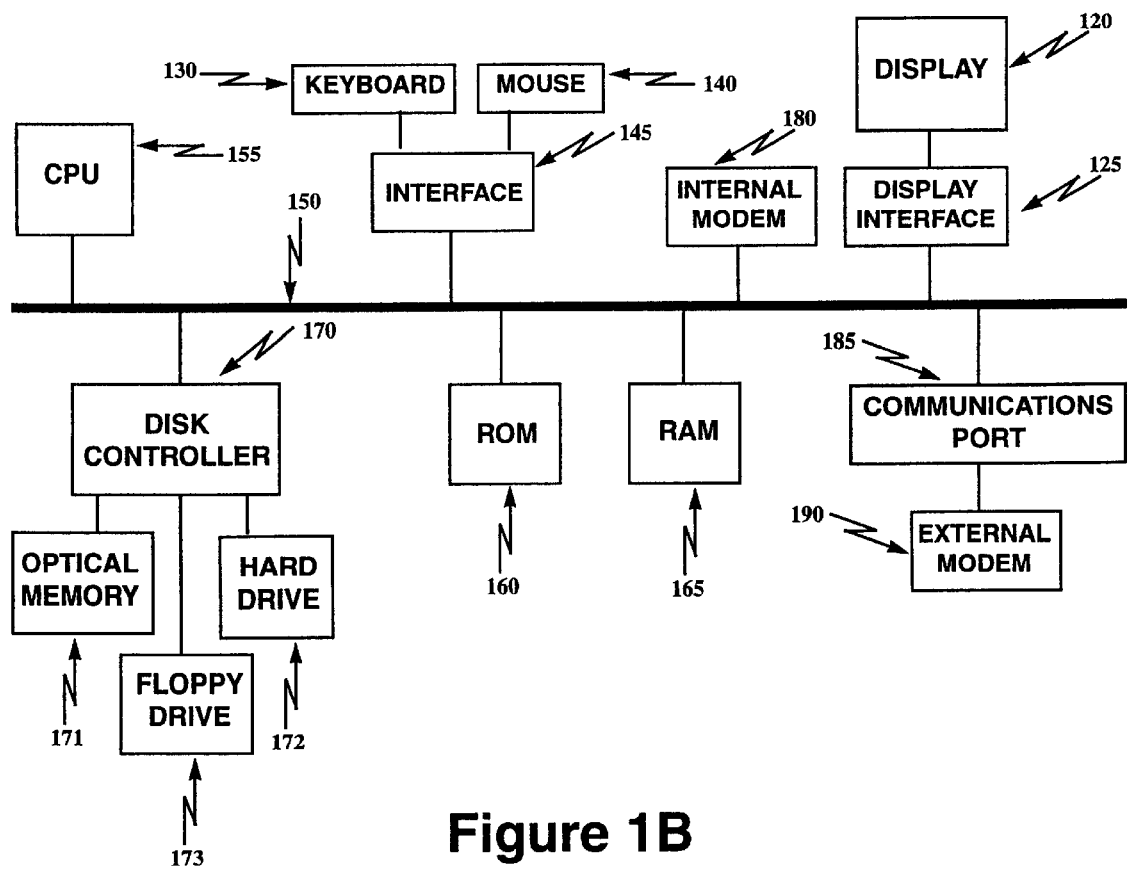
FIG. 1B is a block diagram of an exemplary bus architecture suitable for carrying out the invention.

FIG. 1B is a block diagram of an exemplary computer bus architecture of a type suitable for carrying out the invention. A bus 150 connects a central processing unit 155 to other elements of a computer processor system 100. An interface 145 connects external input/output devices such as keyboard 130 and mouse 140. A display interface 125 is also connected to the bus and interfaces the computer display 120 to the central processing unit and to other devices. In this exemplary embodiment, read only memory (ROM) 160 and random access memory (RAM) 165 provides storage of program and data information utilized by the CPU 155. A disk controller 170 permits information to be read from and written to mass storage such as optical memory 171, hard drive 172 and floppy drive 173. A communications port 185 provides a communications interface between external devices and the computer bus 150. An internal modem 180 connects directly to the bus 150 of the computer. The communications port may optionally be utilized to connect to an external modem 190 if an external modem is utilized either in lieu of or as supplemental to internal modem 180.

Figure 1C:
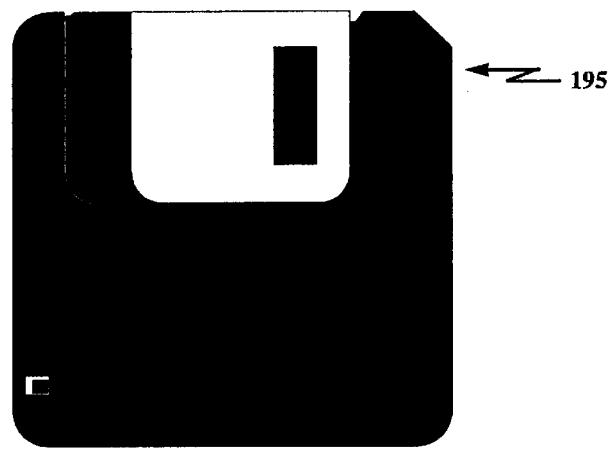
FIG. 1C is an illustration of an exemplary memory medium suitable for storing program information and data.

FIG. 1C is an illustration of an exemplary memory medium suitable for storing program and data information in accordance with the invention. In the example shown, program and data information are stored on a floppy disk 195.

Figure 1D:
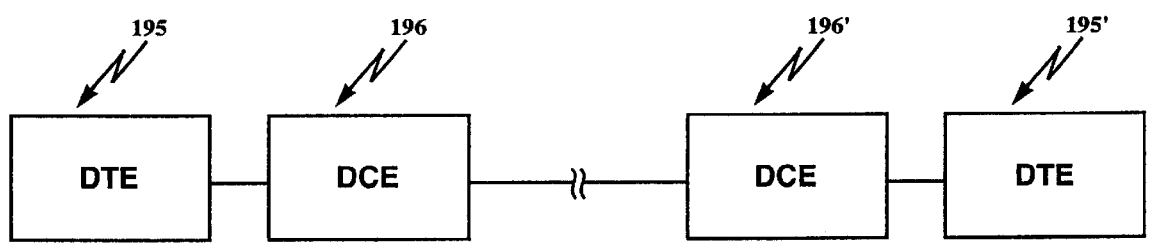
FIG. 1D is a block diagram of computer-to-computer communications.

FIG. 1D is a block diagram of computer-to-computer communications. Historically, a terminal or computer driving a modem is referred to as data terminal equipment (DTE) such as DTE 195 shown in FIG. 1D. The data terminal equipment interfaces with data communications equipment (DCE) 196 and DCE 196 connects with DCE 196' across a communications link. The DCE at the other end (196') connects with its own receiving host DTE 195'. DCEs are typically modems and the interface specifications which describe how a computer interacts with a modem are standardized and well-known. Similarly, the way that two DCEs interact when passing data is also standardized and known. The communications may occur by direct connection or over a network.

Figure 2:
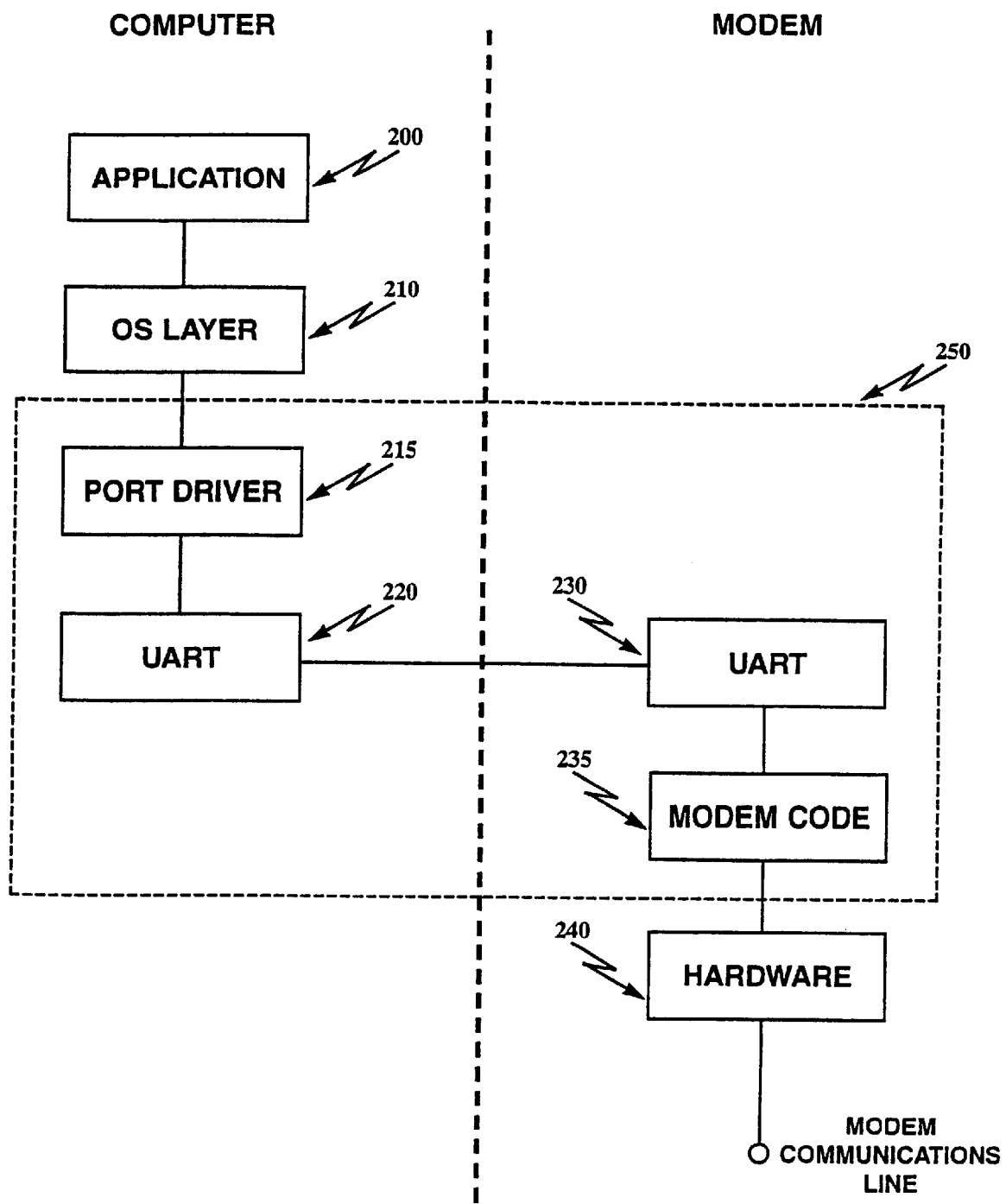
FIG. 2 is a block diagram showing exemplary software and hardware relationships between a computer (DTE) and a modem (DCE) of the prior art.

FIG. 2 is a block diagram showing exemplary software and hardware relationships between a computer (DTE) and a modem (DCE) of the prior art. On the computer side, an application program 200, such as terminal software used for controlling communications, runs over an operating system layer 210. The operating system provides a consistent interface to certain lower level services as is known in the art. In this case, the operating system layer 210 interfaces a port driver 215 which controls a universal asynchronous receiver transmitter (UART) 220. When the computer is connected to a modem, either an internal or an external modem, the UART from the computer 220 connects to a UART 230 in the modem. That way, data and instructions are sent from the computer to the modem. Data and instructions from the UART are processed by a block of modem code 235 which may vary from manufacturer to manufacturer of modems. The modem code controls the modem hardware 240 to send and receive data to and from the modem communications line. Although not expressly shown in FIG. 2, modems, be they internal or external, typically have their own processor, bus and supporting hardware for running the modem code 235 and for carrying out the other functions required in the modem.

Figure 3:
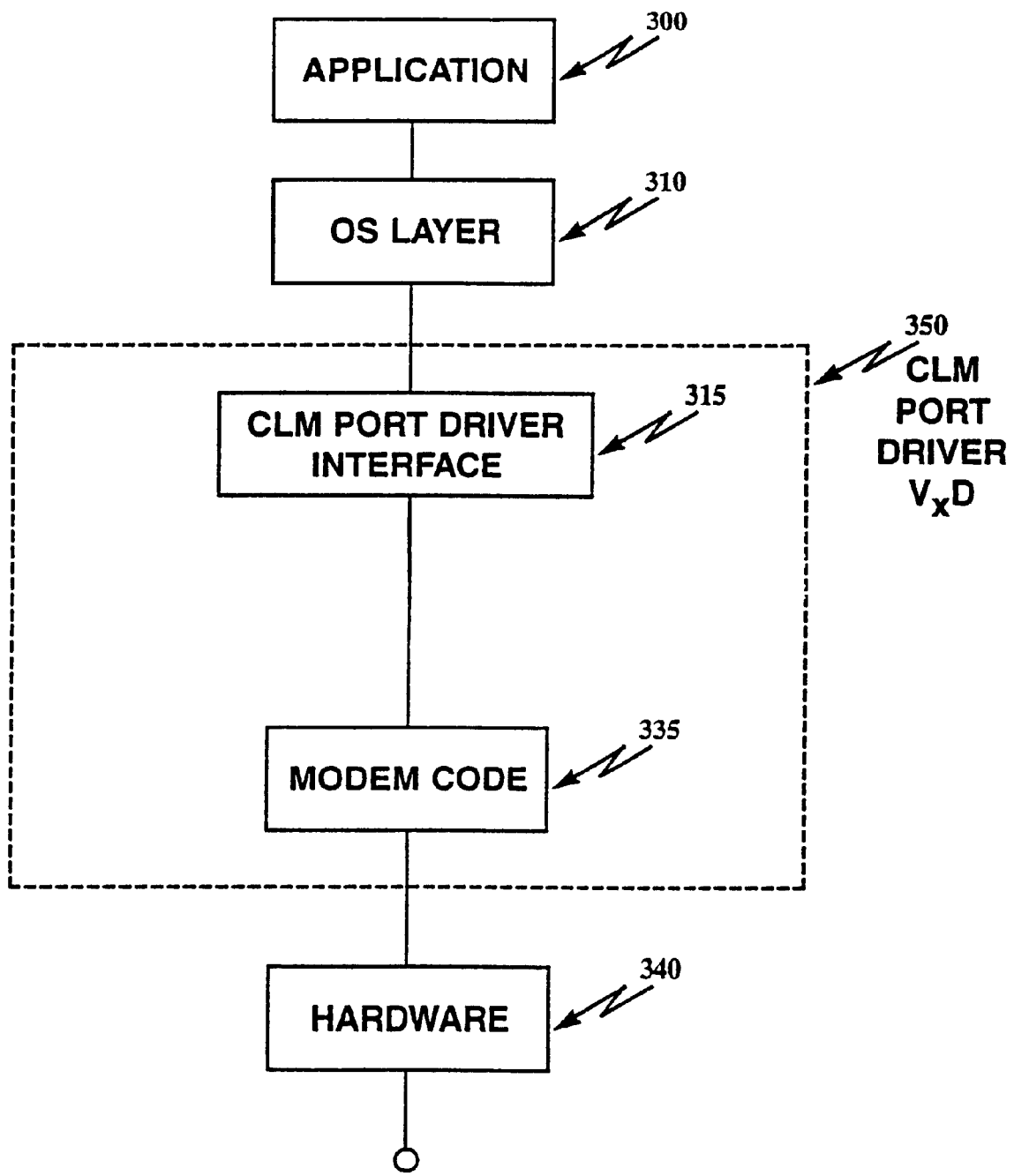
FIG. 3 is a block diagram of a controllerless modem (CLM) in accordance with the invention.

FIG. 3 is a block diagram of a controllerless modem (CLM) in accordance with the invention. Application 300, operating system layer 310 and hardware 340 corresponds roughly to application layer 200, operating system layer 210 and hardware 240 of FIG. 2. In FIG. 3, however, a CLM port driver 350 which constitutes a virtual device driver (VxD), replaces the corresponding functionality 250 shown in FIG. 2. Note that the necessity for UART-to-UART communications is eliminated. The CLM port driver 350 runs on the host and therefore does not require its own dedicated processor bus structure and other supporting hardware.

The CLM port driver includes a CLM port driver interface 315 which manages data and instructions to and from the operating system layer 310. In cases where it is desirable to keep the modem code 335 the same as modem code 235 utilized in modems having a dedicated processor, a software UART emulation layer may be placed between the CLM port driver interface 315 and the modem code 335 and utilized to give the appearance that the modem code is talking to a UART as it did in the prior art. It is of course preferable to simply write the CLM port driver interface to directly control the modem code 335 without the necessity of emulating a UART for interface purposes.

The invention will be described with reference to a modern operating system, in this case, with respect to the Windows 95™ operating system. Windows 95™ is a Trademark of Microsoft Corporation. It is apparent, however, that the invention has application to other operating systems generally.

In a Windows 95™ environment, the CLM port driver interface 315 communicates with the VCOMM layer of Windows 95™ to provide hardware—specific modem functions. Most communications API calls made by applications will be translated into VCOMM calls, which are then translated into port driver calls. The port driver maintains setup information, configures and interfaces with the operating system layer for data transfer, handles aspects of flow control and issues notifications to the application of events and the like. It also maintains the settings for baud rate, flow control, parity, data bits, stop bits, etc. It also keeps track of the state of DTR, DSR, RLSD, and ring lines. Buffers are set aside and are used for transferring data between the modem and the computer by passing data into and out of the buffers.

Figure 4:
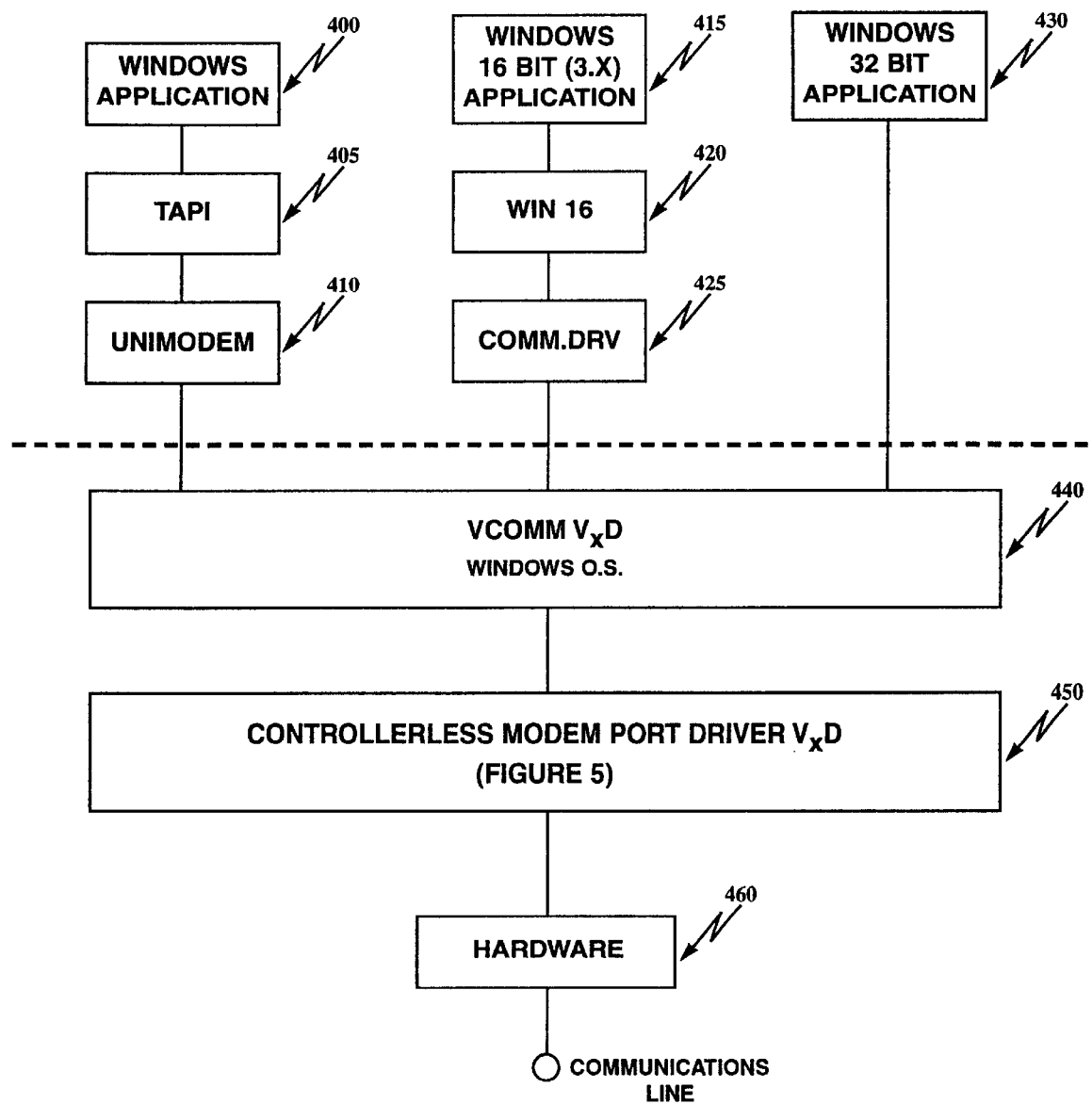
FIG. 4 is a block diagram showing the implementation of a controllerless modem in accordance with the invention in a Windows 95™ operating system environment.

FIG. 4 is a block diagram showing implementation of a controllerless modem in accordance with the invention in a Windows 95™ operating system environment. The privileges with which certain modules run in a Windows 95™ environment are determined by the ring level. Ring 0 is the most privileged layer whereas ring 3 is less privileged. Certain windows applications 400 will interface to communication services over a telephone application programming interface (TAPI) 405 and a unimodem 410 layer. Sixteen bit applications such as those found in Windows 3.X (415) interface through a WIN 16 layer 420 and a com.drv interface 425. Windows 32 bit applications (430) interface directly. The interfacing of legacy DOS applications requires a treatment different from that described in accordance with this invention and will not be described herein. Each of the applications 400, 415 and 430 acquire communication services through a VCOMM VxD (440) of the Windows 95™ operating system. The VCOMM VxD of the Windows 95™ operating system then interfaces directly with the controllerless modem port driver VxD 450 in accordance with the invention as described in conjunction with FIG. 5. The controllerless modem port driver VxD then drives the hardware 460 for modem communications. Note that the VCOMM VxD and the controllerless modem port driver VxD 450 operate at ring 0 level.

Figure 5:
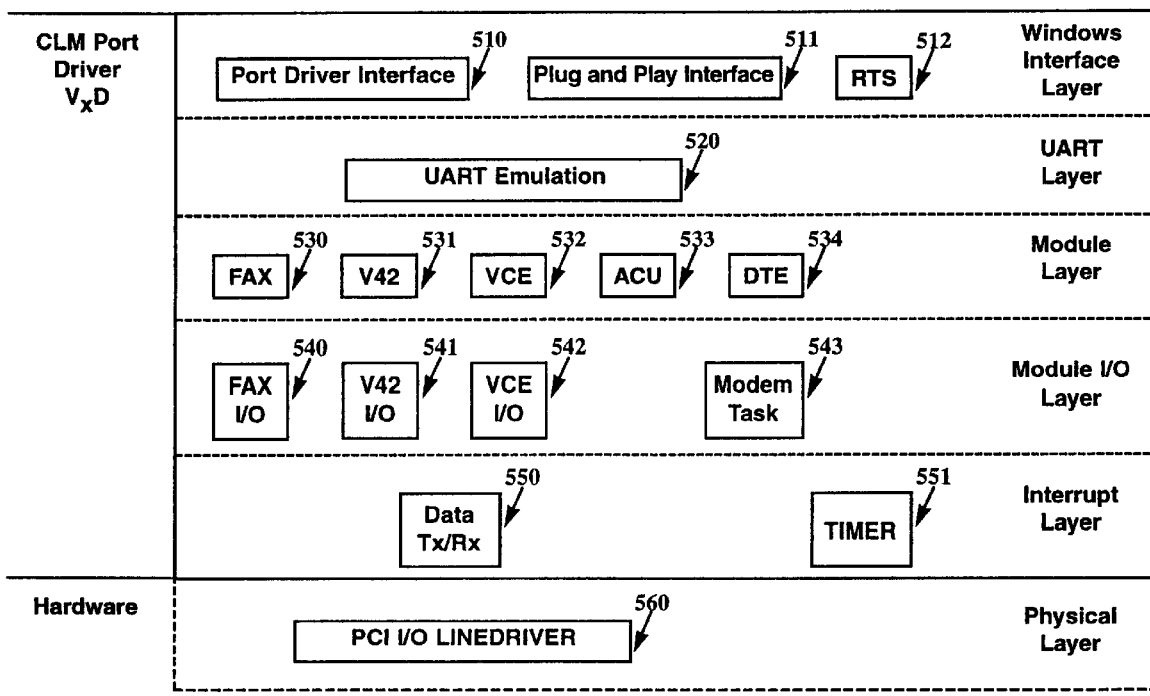
FIG. 5 is a diagram showing software layers of a controllerless modem port driver VxD and its hardware interface.

FIG. 5 is a diagram showing software layers of a controllerless modem port driver VxD and its hardware interface. These include the Windows interface layer, an optional UART layer, the module layer, the module I/O layer, the interrupt layer, and the physical layer. The port driver interface 510 and the UART emulation 520 were discussed in conjunction with FIG. 4 above.

Plug and play makes it easy for computer users to add new hardware to their systems. Plug and play prevents device conflicts, allocates resources, and enables the enumeration of devices on an automatic basis. The controllerless modem presents a PCI based interface which is plug and play compatible with Windows 95™. All configuration management in the plug and play framework is controlled by the configuration manager of the Windows 95™ operating system.

The real time services (RTS) module 512 with the Windows interface layer is utilized to ensure that the CLM port driver VxD gets adequate processing time to service its needs. RTS utilizes services of the host to set timers and provide time out responses to the CLM port driver VxD. The RTS 512 is described in more detail in the co-pending application referred to above. In a preferred embodiment, real time services provides processing time to the VxD in a way which is controllable as to the frequency of the processor allocation and as to its duration. Timer 551 which provides timing for the interrupt layer can either be implemented independently or utilize the services of RTS for its functionality. The fax module 530, V.42 module 531, and VCE module 532 provide the various protocol services for the handling of fax, V.42 data and voice services provided by the modem. The ACU module 533 functions somewhat as an operating system for the modem. The DTE module 534 is responsible for break handling and terminal escape sequence processing.

The fax I/O 540, V.42 I/O 541 and VCE I/O 542 provide an input/output interface to the data transmit receive module 550. The modem task 543 implements DCE functionality. The data transmit/receive module 550 of the interrupt layer passes data to the PCI bus I/O line driver 560 for transmission over the communications line. The functionality allocated to hardware and software begins to blur in the physical layer and may be implementation dependent. In one implementation, the PCI I/O line driver 560 signals data TX/RX 550 of the interrupt layer that data has been received and requires processing. The data TX/RX module 550 will then signal an interrupt so that the incoming data can be serviced. Outgoing data, may be typically loaded into the PCI's I/O line driver 560 for transmission when line conditions permit.

What is significant, is that the DCE hardware no longer requires the dedicated processor or controller and no longer requires UARTs in order to operate. Depending upon the amount of control required in the hardware of a particular implementation, that control can either be run on the host or can be implemented as a relatively simple finite state machine without the necessity of a separate dedicated processor.

Figure 6:
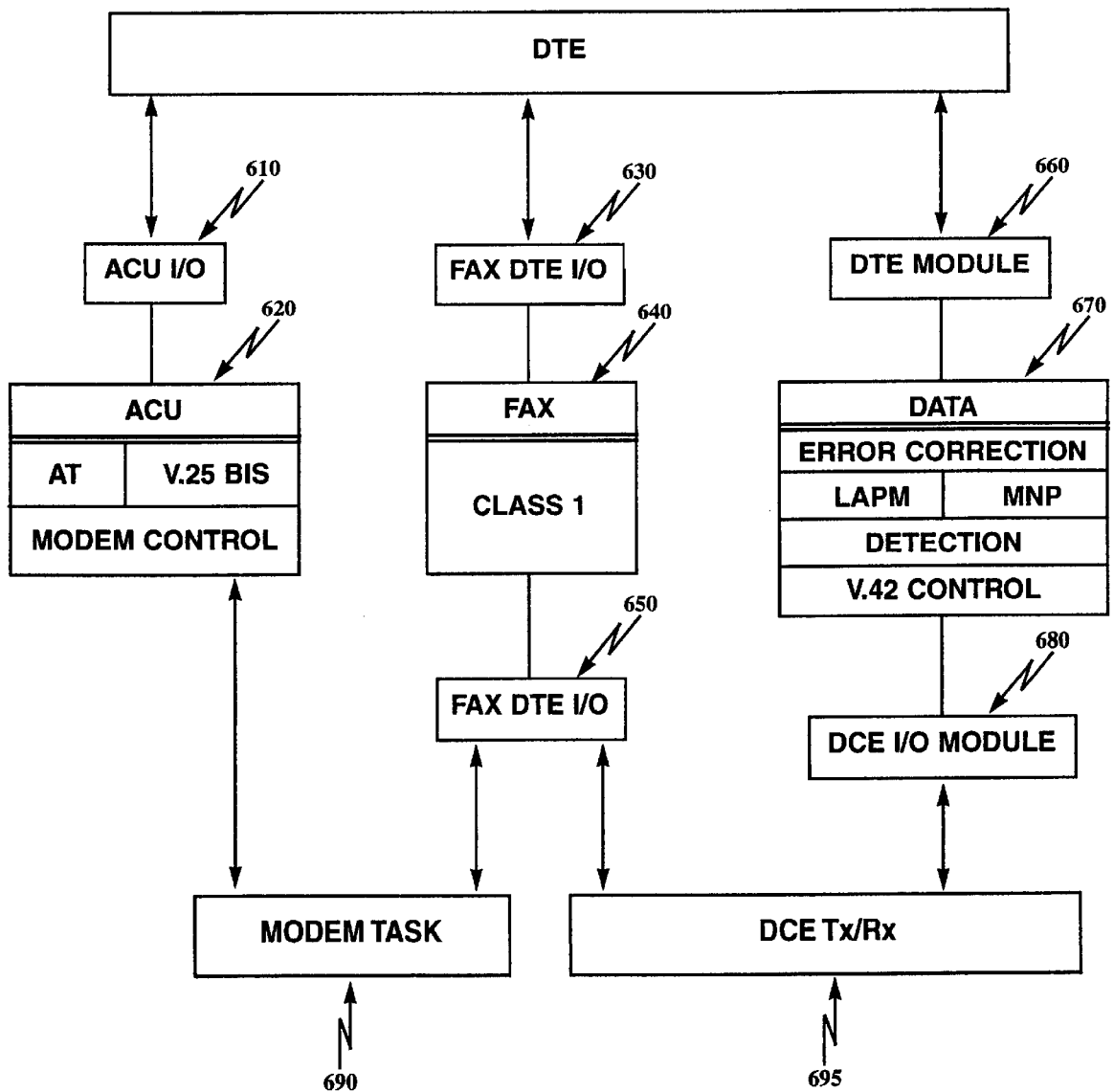
FIG. 6 is a block diagram of an exemplary implementation of modem codes shown in FIGS. 2 and 3.

FIG. 6 is a block diagram of an exemplary implementation of a modem code shown in FIGS. 2 and 3. For simplification purposes, only fax and V.42 data modes are illustrated in FIG. 6. Voice handling is not shown. In the example shown in FIG. 6, three separate classes of events are processed in parallel channels. The DTE information 600 received from the software UART layer 320 can include, in the example shown, either control functions which will be routed to the ACU unit or fax related information and data transmission information and data.

ACU type events are routed over the ACU I/O module 610 to the ACU processing module. The processing module handles control the operation of the modem. Incoming fax information is routed to the fax module 640 where, in the example shown, a class 1 fax functionality is implemented and the fax I/O data is routed to and from the DCE 695. The DTE module 660 interfaces incoming data to the data module 670 where error detection and correction are performed using, for example, LAPM or MNP. In addition, V.42 control is implemented before being passed the DCE I/O module 680 and to the DCE transmit and receive module 695.

When implementing previously developed modem code in a controllerless modem environment, the code should be reviewed to remove infinite loops and long polling delays. Mechanisms can be put in place to limit the amount of time that the code may delay and to limit the number of loops that may execute consecutively without status checking. If long loops exist to wait for data to be input from that PC or line, for example, special background processing time could be given to the corresponding code modules to allow the data to "catch up" when necessary. Effort should be made to prevent the fax code from locking up the computers processor for an extended period of time. The following is a list of items that should be considered in implementation:

1. It may be late in configuring the line but HDLC packets are mandatorily transmitted upto three times so latency of three to five seconds is acceptable. This could become an issue if delay is over six or nine seconds. A failure will occur.
2. Remove "infinite while" loops that wait for events.
3. Check for fax and voice timer resolutions of less than 10 ms.
4. One should check for the DOS full screen effects on timers.
5. One should check whether disk access steals too much time.

There has thus been described a controllerless modem which reduces hardware requirements for modems while ensuring adequate to processing time to the modem so that communication functions are not degraded. In addition, the invention overcomes the problems of the prior art and provides a lower cost solution to communications requirements.

Figure 7:
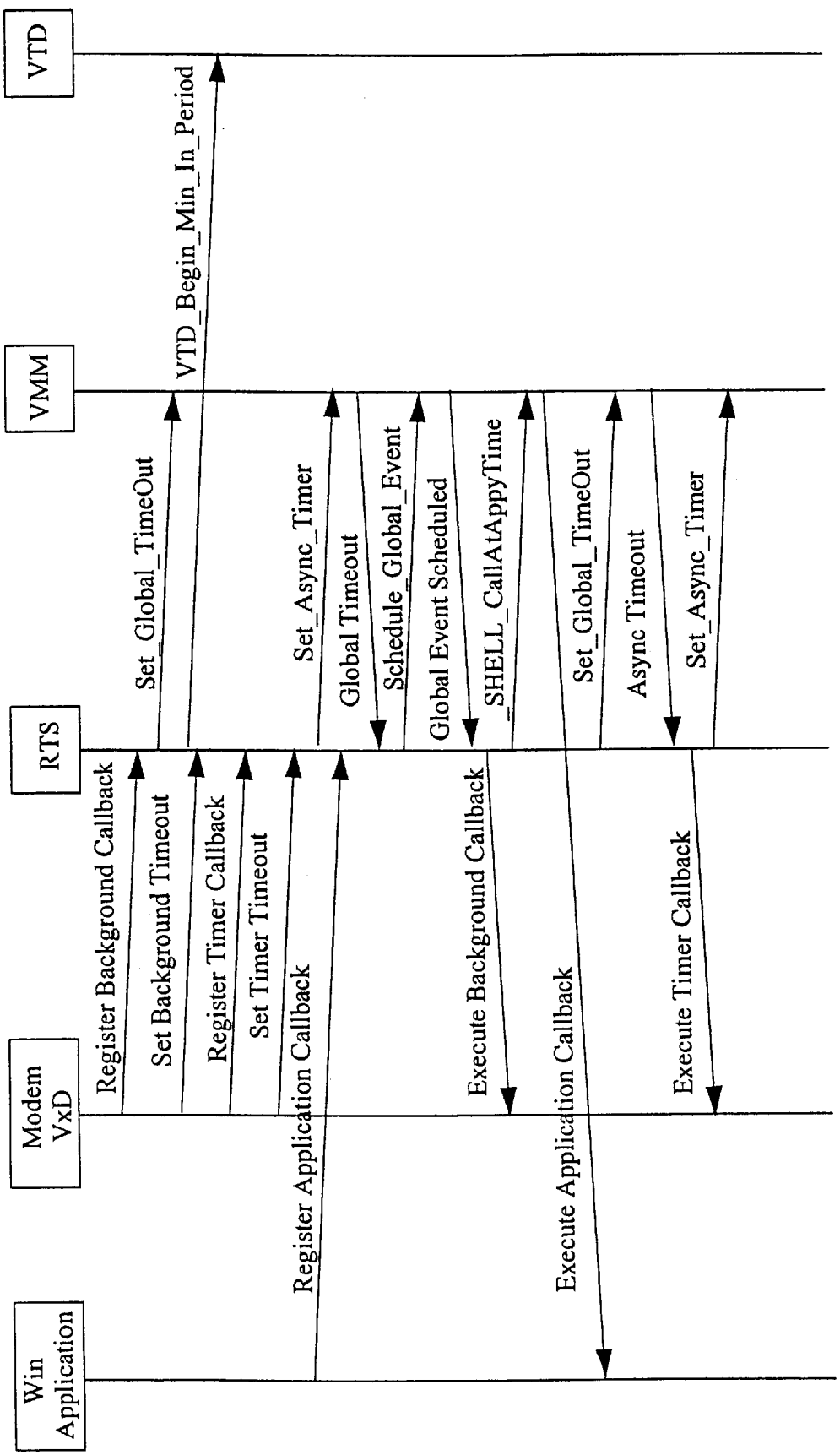
FIG. 7 is a timing representation illustrating interprocess communications between RTS and the modem VxD and operating systems services supported by the virtual machine manager and a virtual device driver for a timing device (VTD).

FIG. 7 is a timing representation illustrating interprocess communications between real time services (RTS) and the modem VxD (which is a general virtual device driver that is a 32-bit, protected-mode driver that manages a system resource such as a hardware device or installed software, so that more than one application can use the resource at the same time) and operating system services supported by the virtual machine manager and a virtual device driver for a timing device (VTD). This particular drawing includes several services running simultaneously. To facilitate explanation of each of the types of services running, portions of this drawing will be extracted and displayed in subsequent figures.

Three principal services are being illustrated simultaneously in FIG. 7. The first service is the background call back which activates the ACU in the modem in a timely fashion to ensure adequacy of modem functions. (The ACU background process or function is roughly analogous to a main routine and calls a plurality of subordinate routines sequentially. In a microcontroller environment, the ACU background loop would run continuously and be handled by the microcontroller. With the microcontroller functionality being handled by the host in a host-based modem environment, one needs to ensure that sufficient CPU access and time exist to permit modem functions to reliably occur without, for example, dropping any connections or characters.) The second service is one designed to ensure a frequent heartbeat for the modem. The third service permits an application process to initiate a transfer as a time which will not interfere with other processes. These services are shown respectively in FIGS. 8–10.

Figure 8:
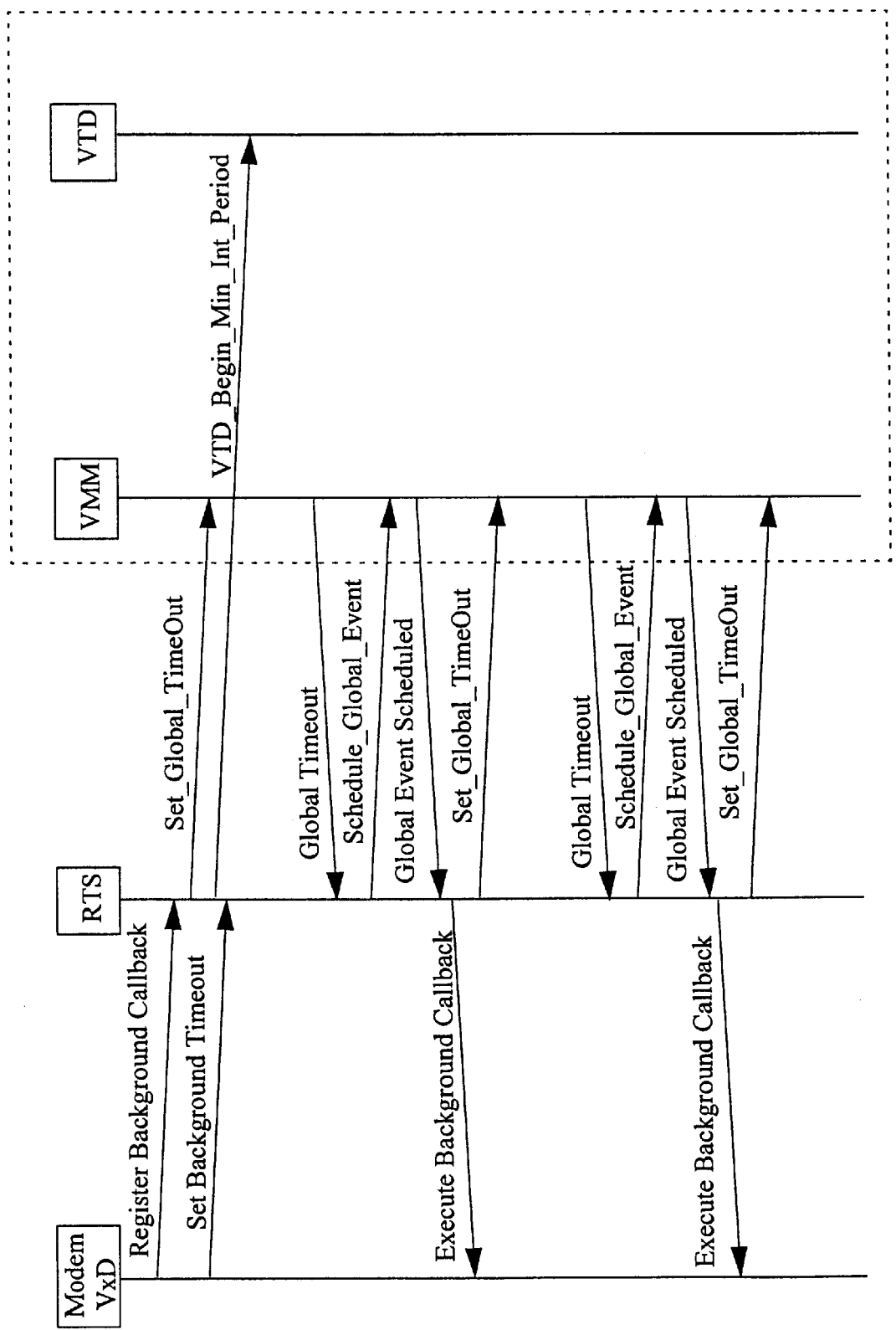
FIG. 8 is a timing representation of interprocess communications used periodically to activate a modem's BACKGROUND function.

In FIG. 8, the process begins with a request from the modem device driver to RTS to register a background call back. In response thereto, RTS invokes the set global_timeout command to the virtual machine manager (VMM). RTS also sends a VTD_begin_min_int_Period to set the granularity of the timer. Typically, the timer is set at a default of 54 milliseconds. However, this time may be reduced, using this command, to as small as the granularity of a programmable interrupt timer (PIT) allows, such as an Intel® 8253 timer. The modem V×D then sets a background timeout interval. Typically, this timeout interval is a hundred milliseconds or less. In response to the global timeout set previously, the global timeout occurs and the VMM module notifies RTS. RTS then sends a schedule_global_event command to the VMM and receives a global event scheduled response. When that response comes in, a background call to ACU is executed and another set_global_timeout command is sent to the VMM. The last four interchanges between the RTS and the VMM constitute a repetitive set which occur periodically, resulting in execution of the ACU background process periodically.

Figure 9:
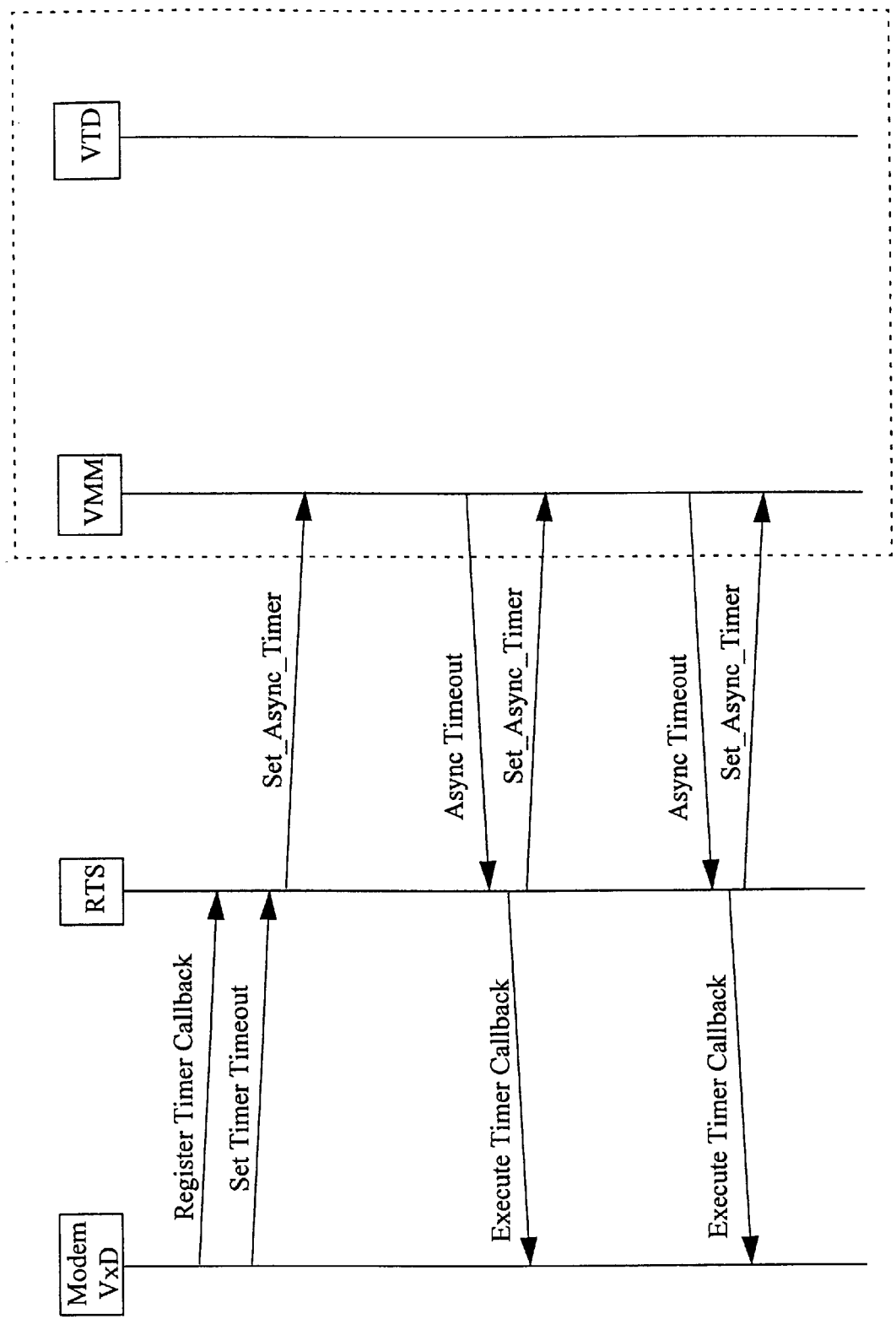
FIG. 9 is a timing representation of interprocess communications used to act as a heartbeat for the modem.

FIG. 9 is a timing representation of interprocess communications used to act as a heartbeat for the modem. The modem V×D registers a timer call back with RTS and sets the timer time out interval. In response thereto, RTS sends a set_async_timer to the VMM and, when that timer times out, RTS is notified by VMM and executes a timer call back which triggers a heartbeat or a decrement of the modem clock in the modem mode. After the timer call back is executed, RTS again sends a set_async_timer command to the VMM. The process of setting an asynchronous timer, having the timer time out and executing a timer call back as a heartbeat are repeated periodically to ensure an adequate heartbeat for the modem.

Figure 10:
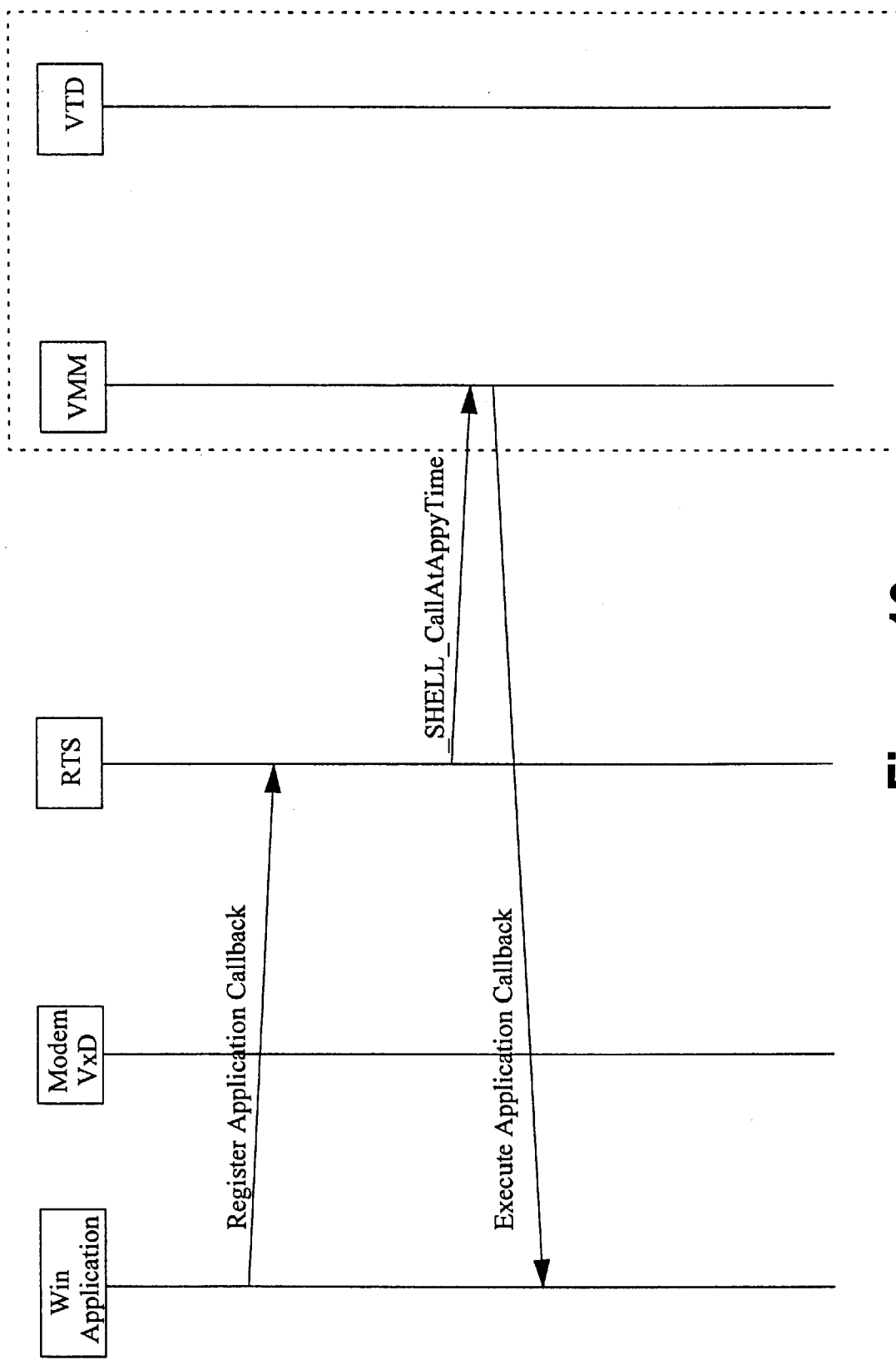
FIG. 10 is a timing representation of interprocess communication used to permit an application to initiated a transfer at a time which will not interfere with other processes.

FIG. 10 is a timing representation of interprocess communications used to permit an application layer to initiate a transfer at a time which will not interfere with other processes. In certain initialization sequences, a Windows® application may request information about the "personality" of the modem. Such a call would be routed to RTS which would then invoke a _SHELL_CallAtAppyTime. When the VMM detects that the personality exchange between the modem and the application can occur without damaging ongoing input/output (I/O) or other processes, an application call back will be executed to the application and the exchange will occur.

Thus, by using real time services, and the services of the virtual machine manager, a host based modem or other process or device can be implemented which is guaranteed to receive an adequate share of central processing unit (CPU) attention, regardless of the other applications or drivers running simultaneously. By implementing this real time service as a virtual device driver, one has access to the services of the virtual machine manager in a which permits fair and equal competition for CPU time regardless of the problems that would otherwise occur in the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A computer, comprising:
   a. a processor,
   b. an operating system running on said processor, and
   c. a virtual device driver, interfaced to said operating system, providing modem functionality for managing communications over a communications port wherein the virtual device driver utilizes real time services to ensure adequate processing time for said modem functionality and wherein the real time services at least include registering a background call back to timely activate an automatic control unit for ensuring adequacy of said modem functionality, ensuring a frequent heartbeat for said modem functionality, and determining whether a personality exchange between said modem functionality and a computer application is able to occur without damaging other computer processes.

2. The computer of claim 1 in which said processing time is controllable as to at least one of a frequency with which a slice of processing time is made available and a duration of the slice of processing time.

3. The computer of claim 1 in which said modem functionality includes at least one of fax services, voice services and data services.

4. The computer of claim 1 in which said virtual device driver is implemented in layers, including at least three of an operating system interface layer, a UART layer, a module layer, a module I/O layer, an interrupt layer and a physical layer.

5. The computer of claim 1 in which said virtual device driver includes a software layer emulating UART to UART communications.

6. The computer of claim 1 in communications with another computer.

7. The computer of claim 1, wherein the frequent heartbeat is generated by repeatedly executing a periodic process of setting an asynchronous timer, timing out said asynchronous timer, and executing a timer call back.

8. A computer comprising:
   a. a processor;
   b. a process, running on said processor for providing communications to and from one or more external devices over a communications link and for interrupting said processor to obtain processing time wherein said process at least includes registering a background call back to timely activate an automatic control unit for ensuring adequacy of providing said communications, ensuring a frequent heartbeat for said communications, and determining whether a personality exchange between said communications and a computer application is able to occur without damaging other computer processes.

9. The computer of claim 8, wherein the frequent heartbeat is generated by repeatedly executing a periodic process of setting an asynchronous timer, timing out said asynchronous timer, and executing a timer call back.

10. A method of operating a computer to obtain communications services, comprising the step of:
    a. running a process for providing modem functionality as a virtual device driver on said processor wherein the virtual device driver utilizes real time services to ensure adequate processing time for said modem functionality and wherein the real time services at least include registering a background call back to timely activate an automatic control unit for ensuring adequacy of said modem functionality, ensuring a frequent heartbeat for said modem functionality, and determining whether a personality exchange between said modem functionality and a computer application is able to occur without damaging other computer processes.

11. The method of claim 10, wherein ensuring the frequent heartbeat further comprises the step of:

repeatedly executing a periodic process of setting an asynchronous timer, timing out said asynchronous timer, and executing a timer call back.

12. A method of operating a computer to obtain communications services, comprising the step of:

a. running a process on a computer with a processor for providing communications to and from one or more external devices over a communications link and for interrupting said processor to obtain processing time wherein said process at least includes registering a background call back to timely activate an automatic control unit for ensuring adequacy of providing said communications, ensuring a frequent heartbeat for said communications, and determining whether a personality exchange between said communications and a computer application is able to occur without damaging other computer processes.

13. The method of claim 12, wherein ensuring the frequent heartbeat further comprises the step of:

repeatedly executing a periodic process of setting an asynchronous timer, timing out said asynchronous timer, and executing a timer call back.

14. A computer system comprising:

a. a network;

b. a first computer connected to a second computer over said network; at least one of said first and said second computers having a virtual device driver providing modem functionality wherein the virtual device driver utilizes real time services to ensure adequate processing time for said modem functionality and wherein the real time services at least include registering a background call back to timely activate an automatic control unit for ensuring adequacy of said modem functionality, ensuring a frequent heartbeat for said modem functionality and determining whether a personality exchange between said modem functionality and a computer application is able to occur without damaging other computer processes.

15. The computer system of claim 14, wherein the frequent heartbeat is generated by repeatedly executing a periodic process of setting an asynchronous timer, timing out said asynchronous timer, and executing a timer call back.

16. A method of operating a computer during communications with another computer over a network, comprising the step of providing modem functionality using a virtual device driver running on a processor of said computer wherein the virtual device driver utilizes real time services to ensure adequate processing time for said modem functionality and wherein the real time services at least include registering a background call back to timely activate an automatic control unit for ensuring adequacy of said modem functionality, ensuring a frequent heartbeat for said modem functionality, and determining whether a personality exchange between said modem functionality and a computer application is able to occur without damaging other computer processes.

17. The method of claim 16, wherein ensuring the frequent heartbeat further comprises the step of:

repeatedly executing a periodic process of setting an asynchronous timer, timing out said asynchronous timer, and executing a timer call back.

18. A computer program product, comprising:

a. a memory medium; and b. a computer program stored on said memory medium, said computer program containing instructions for providing modem functionality as a virtual device driver wherein the virtual device driver utilize real time services to ensure adequate processing time for said modem functionality and wherein the real time services at least include registering a background call back to timely activate an automatic control unit for ensuring adequacy of said modem functionality, ensuring a frequent heartbeat for said modem functionality, and determining whether a personality exchange between said modem functionality and a computer application is able to occur without damaging other computer processes.

19. The computer program product of claim 18, said computer program further comprising instructions for ensuring the frequent heartbeat by repeatedly executing a periodic process of setting an asynchronous timer, timing out said asynchronous timer, and executing a timer call back.

20. A computer program product, comprising:

a. a memory medium;

b. a computer program stored on said memory medium, said computer program containing instructions for providing modem functionality and for ensuring processing time for said modem functionality wherein said instructions utilize real time services to ensure adequate processing time for said modem functionality and wherein the real time services at least include registering a background call back to timely activate an automatic control unit for ensuring adequacy of said modem functionality, ensuring a frequent heartbeat for said modem functionality, and determining whether a personality exchange between said modem functionality and a computer application is able to occur without damaging other computer processes.

21. The computer program product of claim 20, said computer program further comprising instructions for ensuring the frequent heartbeat by repeatedly executing a periodic process of setting an asynchronous timer, timing out said asynchronous timer, and executing a timer call back.

22. A computer program product, comprising:

a. a memory medium;

b. a computer program stored on said memory medium, said computer program containing instructions for providing communications to and from one or more external devices over a communications link and for interrupting a processor to obtain processing time wherein said instructions at least include registering a background call back to timely activate an automatic control unit for ensuring adequacy of providing said communications, ensuring a frequent heartbeat for said communications, and determining whether a personality exchange between said communications and a computer application is able to occur without damaging other computer processes.

23. The computer program product of claim 22, said computer program further comprising instructions for ensuring the frequent heartbeat by repeatedly executing a periodic process of setting an asynchronous timer, timing out said asynchronous timer, and executing a timer call back.

* * * * *